6 Sheets—Sheet 1.

C. P. BABCOCK.
Machine for Making Can-Heads.

No. 214,230. Patented April 15, 1879.

WITNESSES:
Chas. N. Kimball.
Chas. S. Mooney

INVENTOR:
Charles P. Babcock
Per Atty.
William Henry Clifford

6 Sheets—Sheet 3.

C. P. BABCOCK.
Machine for Making Can-Heads.

No. 214,230. Patented April 15, 1879.

WITNESSES:
Chas. H. Kimball
Chas. F. Mooney

INVENTOR:
Charles P. Babcock,
Per atty,
William Henry Clifford

6 Sheets—Sheet 4.

C. P. BABCOCK.
Machine for Making Can-Heads.

No. 214,230. Patented April 15, 1879.

WITNESSES:
Chas. Kimball.
Chas. S. Mooney.

INVENTOR:
Charles P. Babcock
Per Atty,
William Henry Clifford

C. P. BABCOCK.
Machine for Making Can-Heads.
No. 214,230. Patented April 15, 1879.
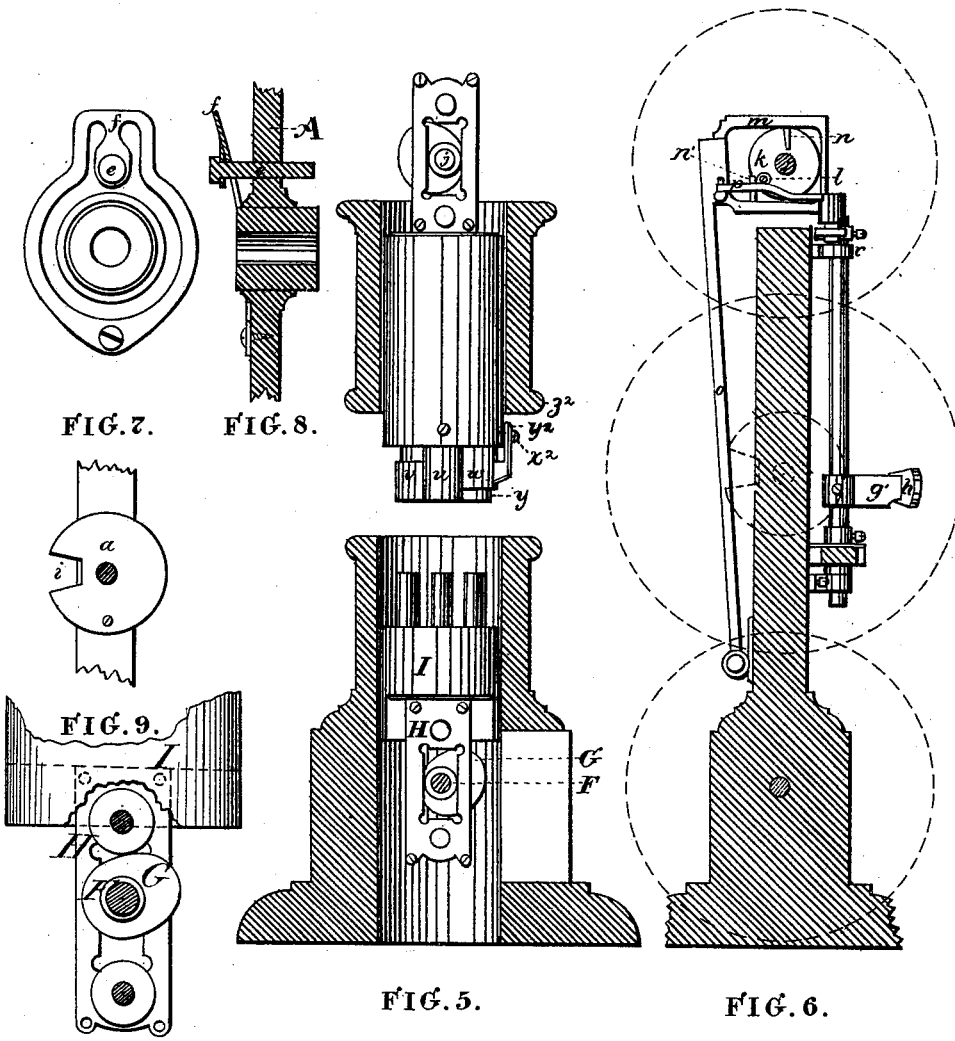
WITNESSES:
Chas. N. Kimball.
Chas. S. Mooney.
INVENTOR:
Charles P. Babcock
Per Atty
Wm. Henry Clifford 6 Sheets—Sheet 6.
C. P. BABCOCK.
Machine for Making Can-Heads.
No. 214,230. Patented April 15, 1879.
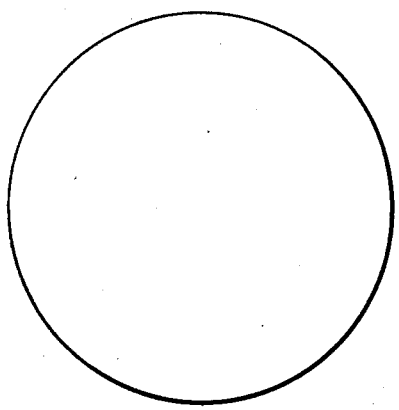
FIG. 10.
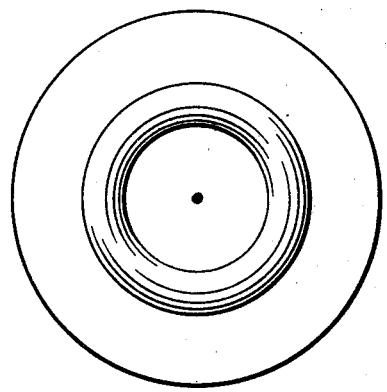
FIG. 11.
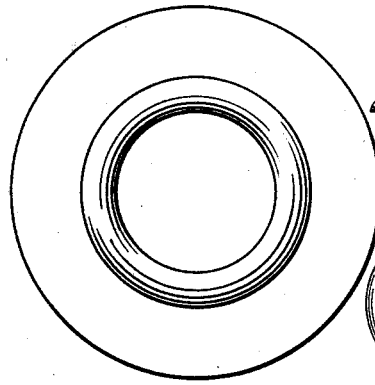
FIG. 13.
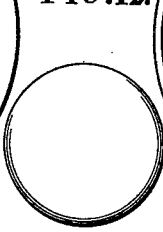
FIG. 12.
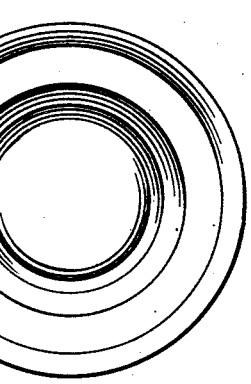
FIG. 14.
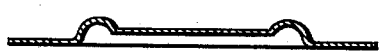
WITNESSES:
Chas. H. Kimball.
Chas. S. Mooney.
INVENTOR:
Charles P. Babcock
Per atty
William Henry Clifford
N. PETERS, PHOTO-LITHOGRAPHER, WASHINGTON, D. C.

UNITED STATES PATENT OFFICE.

CHARLES P. BABCOCK, OF PORTLAND, MAINE.

IMPROVEMENT IN MACHINES FOR MAKING CAN-HEADS.

Specification forming part of Letters Patent No. 214,230, dated April 15, 1879; application filed January 14, 1878.

*To all whom it may concern:*

Be it known that I, CHARLES P. BABCOCK, of Portland, in the county of Cumberland and State of Maine, have invented certain new and useful Improvements in Machines for the Manufacture of Can-Heads; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1:
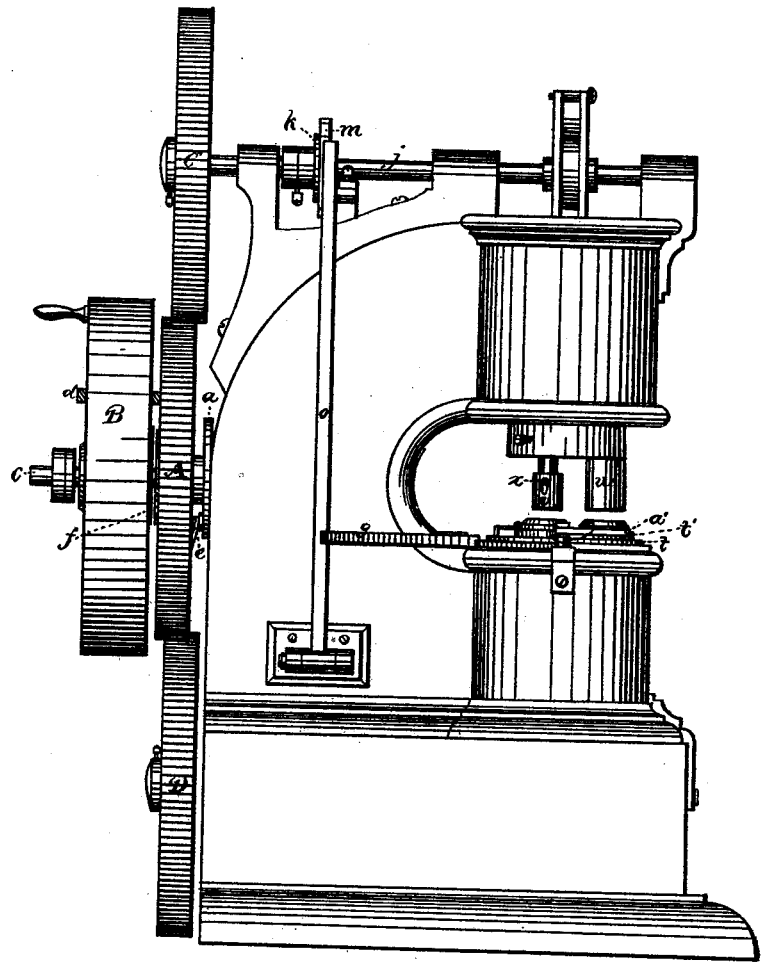
Figure 2:
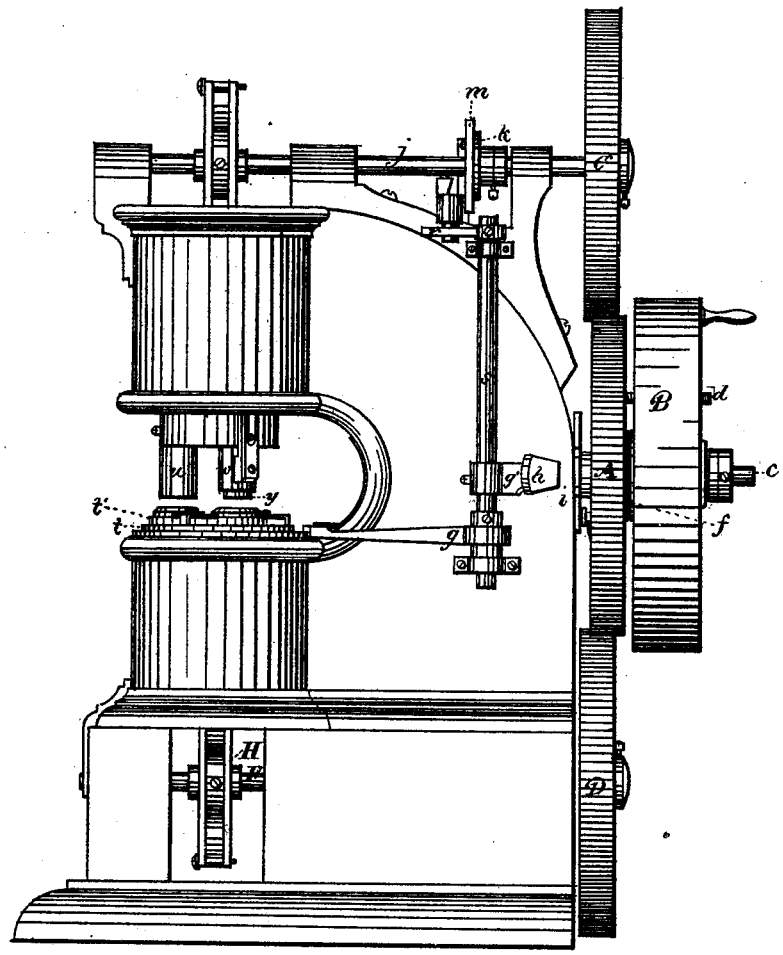
Figure 15:
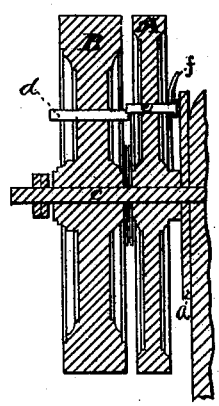
Figure 3:
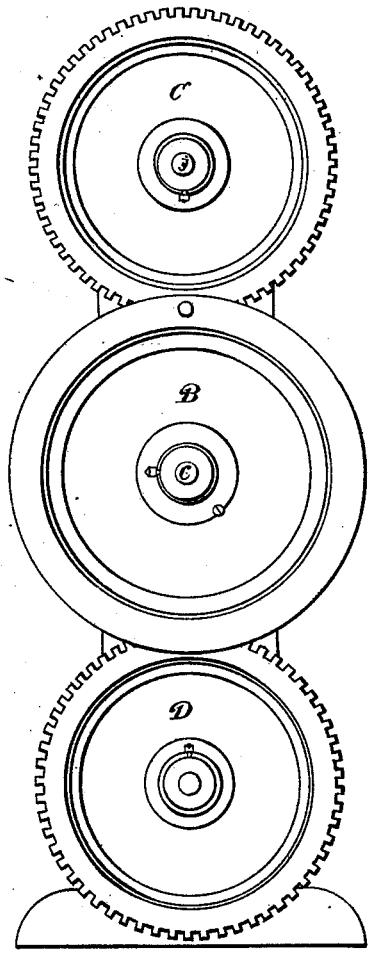
Figure 16:
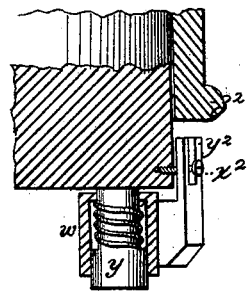
Figure 17:
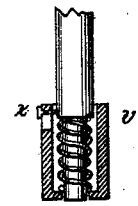
Figure 4:
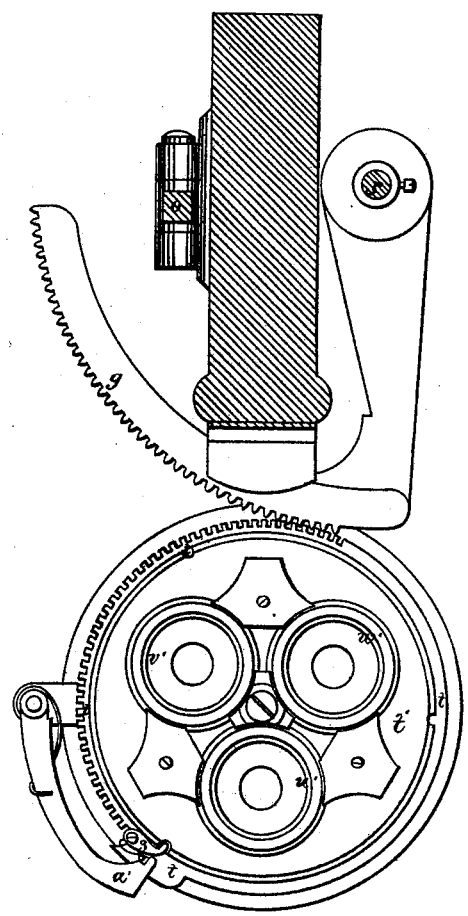

Figure 1 is a side elevation of my machine. Fig. 2 is another side elevation. Fig. 3 is a front-end view. Fig. 4 is a transverse section, showing the bottom dies, the rotary disk by which they are operated, and the arm and tooth segment for moving the disk. Fig. 5 is a vertical section of the cylinders in which the dies and plungers move, and the method of operating the same. Fig. 6 is a vertical section, showing the manner in which the toothed segment is turned. Fig. 7 is a view of the face of the spring $f$ on the gear A. Fig. 8 is a sectional view of the gear A, showing the stud and spring by which the motion of the power-wheel B is imparted to the gear A. Fig. 9 is an outer-face view of the plate $a$ on the driving-shaft of the machine. Fig. 10 is a face and edge view of a can-head when first cut out. Fig. 11 is a face and edge view of a can-head when submitted to the first operation of my machine. Fig. 12 is a face and edge view of the stud when cut out of the can-head by my machine. Fig. 13 is a view of Fig. 11 with stud cut out. Fig. 14 is a face and edge view of a can-head after being finished on my machine, the edge view showing the stud in its place. Fig. 15 shows a section of wheel B, gear A, and plate $a$, and how the wheel B moves A. Fig. 16 is a section of plunger $w$. Fig. 17 is a section of plunger $v$.

Same letters show like parts.

My invention consists of a machine to render useful the studs or parts of the heads of tin cans cut out to form the hole in the heads of said cans. These studs being of the same size as the hole which the cutting of them out had made, heretofore they could not be soldered back or to the hole. They were therefore useless.

The operation of my machine consists in shrinking the hole, or diminishing the diameter thereof, so that the stud will overlap it, and thus permit of soldering to the can-head and of being used. I effect my process by first raising on the disk of tin cut out for a head a circular bulge or wrinkle, as illustrated in Fig. 11. The stud Fig. 12 is then cut out, taking with it enough of the bulge to form the curved edge of the stud seen in Fig. 12. The can-head is then in the condition illustrated in Fig. 13, with a hole in the center, and the bulge or raised circle still on it. By pressure this ring or bulge is then forced downwardly and inwardly, so as to give the conformation to the head well illustrated in the section or edge view, Fig. 14. By this the diameter of the hole has been so diminished that the stud, Fig. 12, laps the edge of the hole in the can-head, and it can, consequently, then be put on and soldered. The circular piece cut out from the can-head can be stretched or flattened down and enlarged, so as to cover the slot in the head or both head and stud together, so as to enable them to overlap. This process can be effected by a variety of means and in different ways, and I will now proceed to describe the structure and operation of the machine by which I produce the result and carry out the process.

B is the power-wheel, set so as to revolve on a shaft, $c$. Through it extends the stud or bolt $d$. This stud, striking a similar device, $e$, in the gear A, imparts the motion of the wheel B to the gear A, and effects its revolution. On the inner side of the gear A the stud $e$ has its head fitted into a spring, $f$. The stud $e$ works easily in its hole in the gear A as it is moved by the spring. The spring $f$ has a tendency to draw the stud $e$ toward the inside—*i. e.*, the side next the gear-wheel A—of the plate $a$, Fig. 9, and the head of the stud, in fact, bears against the face of the plate $a$, Fig. 9, as the gear A revolves. This tendency of the stud $e$ is for this purpose: If while the machine is being worked any part should break or cease to operate, so that the toothed segment $g$ should fail to turn, and so that the arm $g'$, with its piece $h$, should fail to move so as to fit $h$ into the notch $i$ when the head of the stud $e$ came up opposite the notch $i$, then the spring $f$ would draw the stud $e$ into the notch $i$. In consequence of this the stud $d$ would not rest against or strike the stud $e$; therefore the power-wheel B would revolve without carrying with it the gear A, and the operations of the whole machine would stop. This is a provision against an accident of such nature.

The gear A meshes with the gears C and D above and beneath it, respectively, and imparts its motion to them.

C is rigidly set on the shaft $j$. Rigidly set on the same shaft is the truck $k$, with a stud, $l$. This stud works in a rectangular frame-piece, $m$, and at each revolution strikes a pin, $n$, on the inside thereof at the top, and carries the frame forward to a certain extent. Continuing its revolution it next strikes a pin, $n'$, on the bottom of the frame, and moves it backwardly again. Thus a reciprocating motion is imparted to the frame $m$. It is upheld by a pivoted vertical arm, $o$. The arm or frame carries the link or pitman $p$. This lever $p$ has a wrist-pin, which works in the slot of the slotted crank-arm $r$, rigidly set on the top end of the vertical shaft $s$. This shaft has attached to it the arm $g'$, before described, and gives the motion to it. When the stud $e$ comes, in the revolutions of the gear A, opposite to the notch in the notched plate $a$, then the turning of the shaft $s$ will bring the piece $h$ so as to fill the notch, and thus the stud $e$ will pass by it. If the piece $h$ is not so turned as to fill the notch, then the stud $e$ will slip into the notch, and the wheel B will then revolve without operating the machine.

Rigidly fixed on the shaft $s$ is the toothed segment $g$. This segmen is moved by the motions of the shaft. The toothed segment meshes certain teeth in the disk $t$ and moves the same. By this movement of the disk the dies $u'$ $v'$ $w'$ are revolved, so as to present the tin or can heads to the several punches $u$ $v$ $w$. By these punches the operations of cutting out the heads and studs and of shaping and stretching the heads or studs, or both, are performed.

The forms of the different punches or plungers can of course be varied to suit the different methods of so working the tin as to save the studs. As arranged in the accompanying drawings, $u$ is the punch that cuts from a sheet the can-head and stamps it into the form shown in Fig. 11—that is, with circular form, and with a raised ring or bulge near the center thereof. The bulge or ring is produced by a curved depression in the plunger and a projecting part to form the flat center disk illustrated in Fig. 11. While this operation is being performed a plunger rises up through a hole in the center of the die $u$, and with a point pricks a hole in the center of the can-head, Fig. 11. When this form is given to the can-head, then another motion of the toothed segment rotates the disks $t$ $t'$, and brings the die under the punch $v$, and by this one the stud, Fig. 12, is cut out.

The plunger $v$ is composed of two parts—a sleeve or outer part and the cutter or inner part, which cuts out the stud-hole. The sleeve is held by a pin, $x$, which works in a slot in the sleeve. A spring within the sleeve keeps it down even with the lower end of the cutter within it. (See Fig. 17.)

When the stud is cut out it falls down through a hole in the die to the bottom of the machine or to the floor. While the cutting of the stud is taking place a plunger rises up through the hole in the die, and then drops down again before the revolution of the disk $t'$ begins again. The disks $t$ and $t'$ are then revolved by the segment $g$, and the can-head, with the stud-hole now in it, is submitted to the operation of the plunger $w$. This plunger gives it its final shape, as seen in the drawings, Fig. 14. This plunger has a sleeve or outer part and an inner plunger also. This is seen in Fig. 2 and Fig. 16.

After the can-head has been fully stamped to the required shape the plunger or inner part, $y$, is drawn up within the outer part or sleeve. This is to prevent the can-head from adhering to the plunger, and to push it off therefrom, so that when thus finished it will fall to the floor. This is effected by shoulder $z^2$, part $y^2$, with its slot, pin $x^2$, sleeve, spring, and plunger $y$, as seen in Fig. 16.

It will be seen from Fig. 11 (the face view) that when the stud is cut out from the head its curvature around its edges is upward. When placed in the can-head it is reversed in position, as seen in Fig. 14, (the edge view.) The operation of the die and plunger last described is to force inwardly the ring or bulge seen in Fig. 13, and thus so contract the hole in the head that the stud, Fig. 12, will lap the edges of the hole, Fig. 14, and thus serve to close up the can when filled with any article packed therein.

By a slight variation of the forms of the plungers the stretching or flattening out can be partly given to the stud and partly to the can-head; but my machine is one capable of so changing the relative sizes of the stud-hole and the stud that the cut-out stud can be used and soldered to the can-top, and save the loss of the stud cut out and the expense of new ones.

When the punches are operating the upper one of the two disks $t$ $t'$ is stationary, and also while the toothed segment is returning, so as to be ready to revolve the dies with the tin in them, when desired. When the toothed segment thus returns it revolves the lower of the two disks, which one does not carry the dies. This operation is accomplished by means of a hook, $z$, on the lower of the two disks. The hook has a spring to keep it set into two nicks or notches in the upper disk, as seen in Fig. 4 of the drawings. These nicks are of the proper distance from each other to correspond with the toothed segment. When the toothed segment is making its forward motion—i. e., the one that revolves both disks $t\,t'$ simultaneously—the hook is set into one of these nicks, and consequently as the under disk, 1, is moved by segment the upper one, 2, is also moved and carried around. The back or outside of the hook $z$ has an inclined face or surface, and when the reverse motion of the toothed segment $g$ is produced the hook backs out of the nick and slides around on the periphery of the upper disk until it is pressed by its spring into the other nick, and then it draws the upper disk around again, and so on. Another spring-hook, $a'$, is so arranged as to slip into the nick not filled by $z$, and to hold the upper disk stationary while the punches are working. The entering of the hook $z$ into a nick preparatory to revolving the upper disk also pushes or lifts the hook $a'$ out of the same nick by simply slipping in between it and the periphery of the disk. (See Fig. 4.) Thus the several operations of the plungers, dies, and disks are accomplished and regulated.

It remains to describe the method of operating the different plungers. They move simultaneously. The lower gear, D, is rigidly set on the shaft F. On this shaft is the fixed cam G. Over the cam is the frame H, with its friction-pulleys, as seen in Fig. 5. This frame carries a vertical plunger or piston, I, rising and falling in the casing or cylinder. (Seen in Fig. 5.) This piston carries the several plungers that operate up through the dies on the upper of the two disks $t\,t'$. The piston is so arranged as to rise and fall, while the disks $t\,t'$ are motionless. The same set and arrangement of devices on the upper shaft, $j$, moves the descending plungers $u\,v\,w$, and is also illustrated in the upper part of Fig. 5.

What I claim as my invention, and desire to secure by Letters Patent, is—

1. The combination of the toothed segment $g$, disks $t\,t'$, dies and plungers, and hooks $z$ and $a'$, as herein set forth.

2. The combination of the vertical shaft $s$, spring-plate $f$, gear A, plate $a$, stud $d$, spring-stud $e$, arms $g\,g'$, as and for the purposes herein set forth.

3. The combination of the shaft $j$, rectangular frame $m$, truck $k$, lever $o$, vertical shaft $s$, with the arms $g\,g'$, and the toothed segment, either together or separately.

In testimony that I claim the foregoing as my own I affix my signature in presence of two witnesses.

CHAS. P. BABCOCK.

Witnesses:
 WILLIAM HENRY CLIFFORD,
 CHARLES E. CLIFFORD.